United States Patent
Kwon et al.

(10) Patent No.: US 9,807,804 B2
(45) Date of Patent: Oct. 31, 2017

(54) APPARATUS AND METHOD FOR CONTROLLING SLOT USAGE

(71) Applicant: Electronics and Telecommunications Research Institute, Daejeon (KR)

(72) Inventors: Hyoung Jin Kwon, Daejeon (KR); Jae Seung Lee, Daejeon (KR); Min Ho Cheong, Daejeon (KR); Hee Jung Yu, Daejeon (KR); Jae Woo Park, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 76 days.

(21) Appl. No.: 14/412,669

(22) PCT Filed: Jul. 5, 2013

(86) PCT No.: PCT/KR2013/005994
§ 371 (c)(1),
(2) Date: Jan. 2, 2015

(87) PCT Pub. No.: WO2014/007575
PCT Pub. Date: Jan. 9, 2014

(65) Prior Publication Data
US 2016/0073433 A1    Mar. 10, 2016

Related U.S. Application Data

(60) Provisional application No. 61/746,070, filed on Dec. 26, 2012.

(30) Foreign Application Priority Data

Jul. 5, 2012 (KR) .................. 10-2012-0073208
Jul. 5, 2013 (KR) .................. 10-2013-0078833

(51) Int. Cl.
*H04W 74/08* (2009.01)
*H04W 84/12* (2009.01)
*H04W 88/12* (2009.01)

(52) U.S. Cl.
CPC ........ *H04W 74/0891* (2013.01); *H04W 74/08* (2013.01); *H04W 84/12* (2013.01); *H04W 88/12* (2013.01)

(58) Field of Classification Search
CPC ............ H04W 56/00; H04W 74/002; H04W 74/0891; H04W 74/08; H04W 74/04;
(Continued)

(56) References Cited

U.S. PATENT DOCUMENTS 6,657,984 B1 * 12/2003 Semper ............... H04W 48/12
                                              370/338
8,374,142 B2 *  2/2013 Cordeiro ............. H04L 1/0015
                                              370/329
(Continued)

FOREIGN PATENT DOCUMENTS

KR    10-2011-0069070 A    6/2011
KR    10-2012-0023838 A    3/2012
(Continued)

OTHER PUBLICATIONS

International Search Report for PCT/KR2013/005994 filed on Jul. 5, 2013.

*Primary Examiner* — Michael Thier
*Assistant Examiner* — Rownak Islam

(57) ABSTRACT

Provided is slot use control apparatus and method, including an access point (AP) to control a slotted channel access of a station (STA) in a wireless local area network (WLAN) includes generating a synchronization (synch) frame including an identification value indicating an STA allocated to a
(Continued)

slot, and broadcasting the generated synch frame when a channel is in an idle state at a start point of the slot.

13 Claims, 9 Drawing Sheets

(58) Field of Classification Search
CPC . H04W 84/12; H04W 88/12; H04W 74/0866; H04W 88/02; H04W 88/08
USPC .................................................. 370/338, 350
See application file for complete search history.

(56) References Cited

U.S. PATENT DOCUMENTS

| | | | | |
|---|---|---|---|---|
| 2004/0253996 A1* | 12/2004 | Chen | ................ | H04W 52/0216 455/574 |
| 2007/0115853 A1* | 5/2007 | Wentink | ............. | H04N 21/4126 370/252 |
| 2009/0103501 A1* | 4/2009 | Farrag | ................. | H04W 74/02 370/337 |
| 2010/0135268 A1* | 6/2010 | Seok | ................ | H04W 74/0816 370/338 |
| 2010/0177657 A1* | 7/2010 | Kim | ................. | H04W 72/1273 370/252 |
| 2011/0069628 A1 | 3/2011 | Liu et al. | | |
| 2011/0164605 A1 | 7/2011 | Zhen et al. | | |
| 2011/0286402 A1* | 11/2011 | Gong | ................... | H04L 1/1685 370/329 |
| 2012/0300684 A1* | 11/2012 | Wentink | ............ | H04W 52/0216 370/311 |
| 2012/0314636 A1* | 12/2012 | Liu | ..................... | H04W 28/065 370/311 |
| 2012/0327919 A1* | 12/2012 | Benveniste | ............. | H04L 47/14 370/338 |
| 2013/0051381 A1* | 2/2013 | Bracha | ................. | H04W 56/00 370/338 |
| 2013/0272137 A1* | 10/2013 | Kwon | ................. | H04W 72/042 370/311 |
| 2013/0279382 A1* | 10/2013 | Park | .................... | H04W 74/085 370/311 |
| 2013/0301605 A1* | 11/2013 | Kim | ........................ | H04L 1/00 370/330 |
| 2013/0329658 A1* | 12/2013 | Liu | ....................... | H04W 74/02 370/329 |
| 2013/0336182 A1* | 12/2013 | Asterjadhi | ............. | H04L 69/22 370/310 |

FOREIGN PATENT DOCUMENTS

WO    WO 2010/009039 A1    1/2010
WO    WO 2010/043947 A1    4/2010

* cited by examiner

900

APPARATUS AND METHOD FOR CONTROLLING SLOT USAGE

TECHNICAL FIELD

The present invention relates to an apparatus and method in which an access point (AP) managing a network controls a slotted channel access of a station (STA) in a wireless local area network (WLAN) environment, and an terminal for operating thereof.

BACKGROUND ART

In a wireless local area network (WLAN), an excessive number of stations (STAs) in a network or a node may increase a probability of collisions occurring between the STAs. To solve such an issue, a method of using a slotted channel access may be proposed. In the method, an access point (AP) may divide a channel access interval into a slot having a predetermined length, and allocate, to the slot, a point in time at which the STA accesses the channel. The AP may notify the STA of a location and an interval of the allocated slot using a beacon or a broadcast frame and thus, the STA may perform a data exchange in the allocated slot by listening to the beacon. Allocating a slot may allow a predetermined STA or a predetermined STA group exclusive access to a channel. In this instance, a disallowed STA may not access the channel and thus, a number of STAs simultaneously accessing the channel may be reduced. However, when an STA which does not listen to a beacon or a predetermined STA of a basic service set (BSS) adjacent to an overlapping basic service set (OBSS) accesses the channel in the allocated slot, competition may occur with an STA already allocated to the slot, because in the allocated slot, the STA may access the channel using a distributed coordination function (DCF) of a carrier sense multiple access with collision avoidance (CSMA/CA) scheme, in lieu of a time division multiple access (TDMA) scheme. In particular, when the allocated slot corresponds to an uplink (UL) for transmitting data to the AP, a back-off occurring due to a collision between the STAs may increase in power consumption. To ensure that the STA allocated based on the DCF accesses the channel in view of priority, the AP may need to additionally protect the slot allocated to the STA. The STA may not make a full use of of the allocated slot being protected with a method of, for example, acquiring a network allocation vector (NAV) by a request to send/clear to send (RTS/CTS) exchange, restricting the channel access using the beacon by the AP, or using a predetermined frame for the protection. In this instance, another STA may be allowed to access the channel by releasing the NAV.

DISCLOSURE OF INVENTION

Technical Solutions

According to an aspect of the present invention, there is provided a slot use control method for an access point (AP) to control a slotted channel access of a station (STA) in a wireless local area network (WLAN), the method including generating a synchronization (synch) frame including an identification value indicating an STA allocated to a slot, and broadcasting the generated synch frame when a channel is in an idle state at a start point of the slot.

According to another aspect of the present invention, there is also provided a slot use control apparatus for an AP to control a slotted channel access of an STA in a WLAN, the apparatus including a generator to generate a synch frame including an identification value indicating an STA allocated to a slot, and a transmitter to broadcast the generated synch frame when a channel is in an idle state at a start point of the slot.

Effect of the Invention

According to an aspect of the present invention, it is possible to reduce power consumption by preventing an occurrence of a collision between stations (STAs) and decrease a length of a delay in transmission caused by waiting.

When the STA does not use a slot, or when the slot has a remaining time after being used, another STA may be allowed to use the slot. Thus, an efficiency of an entire network resource may increase.

BEST MODE FOR CARRYING OUT THE INVENTION

Hereinafter, embodiments will be described in detail with reference to the accompanying drawings.

When it is determined detailed description related to a related known function or configuration they may make the purpose of the present invention unnecessarily ambiguous in describing the present invention, the detailed description will be omitted here. Also, terminologies used herein are defined to appropriately describe the exemplary embodiments of the present invention and thus may be changed depending on a user, the intent of an operator, or a custom. Accordingly, the terminologies must be defined based on the following overall description of this specification.

Figure 1:
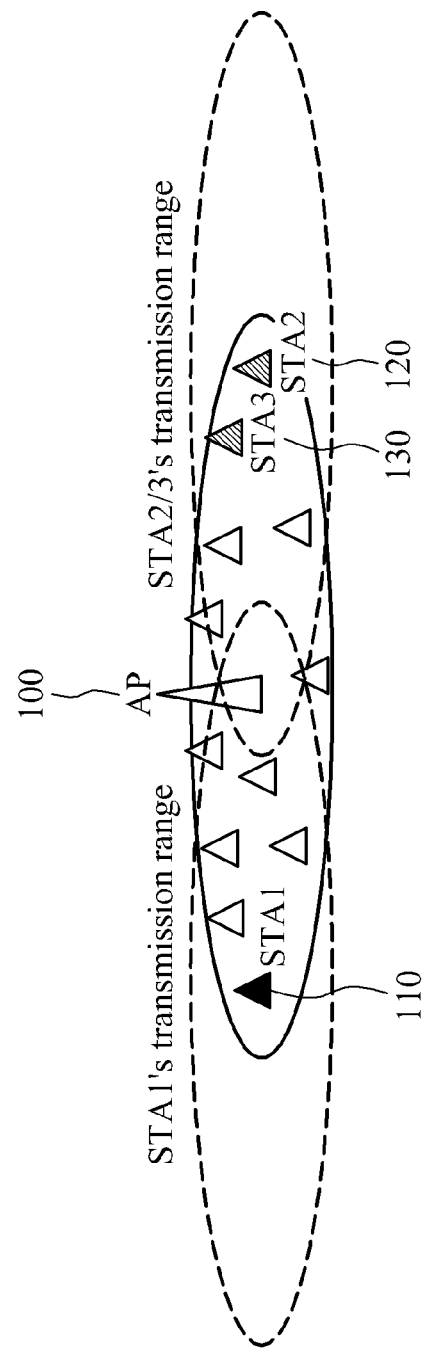
FIG. 1 is a diagram illustrating a wireless local area network (WLAN) environment including an access point (AP) and a plurality of terminals, for example, stations (STAs) to which an embodiment of the present invention is applied.

FIG. 1 is a diagram illustrating a wireless local area network (WLAN) environment including an access point (AP) and a plurality of terminals, for example, stations (STAs) to which an embodiment of the present invention is applied.

In a WLAN defined by the Institute of Electrical and Electronics Engineers (IEEE) 802.11 standard, an environment in which a network includes an excessive number of STAs or a probability of collisions occurring between STAs due to a hidden node may be provided. To solve this issue, a method of applying a slotted channel access scheme may be used in the environment. In the method, an AP 100 may divide a channel access interval into a slot having a predetermined length and allocate, to the slot, a point in time point at which an STA accesses a channel.

A core principle of the method is to reduce a number of STAs simultaneously accessing a channel by varying a channel access time for each STA. To this end, the AP 100 may notify the STA of a location and an interval of the allocated slot using a beacon or a broadcast frame so that the STA may listen to the beacon and perform a data exchange in the allocated slot. In this instance, since a disallowed STA may not access the channel, the number of STAs simultaneously accessing the channel may be reduced.

However, when an STA accessing a channel without listening to a beacon or a predetermined STA of a basic service set (BSS) adjacent to an overlapping basic service set (OBSS) accesses the channel in the allocated slot, competition may occur with an STA already allocated to the slot, because, in the allocated slot, the STA may access the channel using a distributed coordination function (DCF) based on a carrier sense multiple access with collision avoidance (CSMA/CA) scheme, in lieu of using a time division multiple access (TDMA) scheme. For example, the AP 100 may allocate a predetermined slot to a station group including an STA-2 120 and an STA-3 130 and broadcast a location and an interval of the slot allocated to the station group including the STA-2 120 and the STA-3 130. However, when an STA-1 110 fails to receive a broadcast frame, the STA-1 110 may try to access the slot allocated to the station group. In this case, competition may occur, in the corresponding slot, between the STA-1 110 and the station group including the STA-2 120 and the STA-3 130.

When the allocated slot corresponds to an uplink (UL) for transmitting data to the AP 100, a back-off may occur due to a collision between the STAs, which may lead to power consumption for reception resulting from channel listening and power consumption for transmission being greater than the power consumption for reception. Thus, reducing an occurrence of the collision between the STAs is required.

Hereinafter, a method of reducing power consumption of the STA which is allocated using the conventional slotted channel access scheme will be described with reference to FIGS. 2 and 3.

Figure 2:
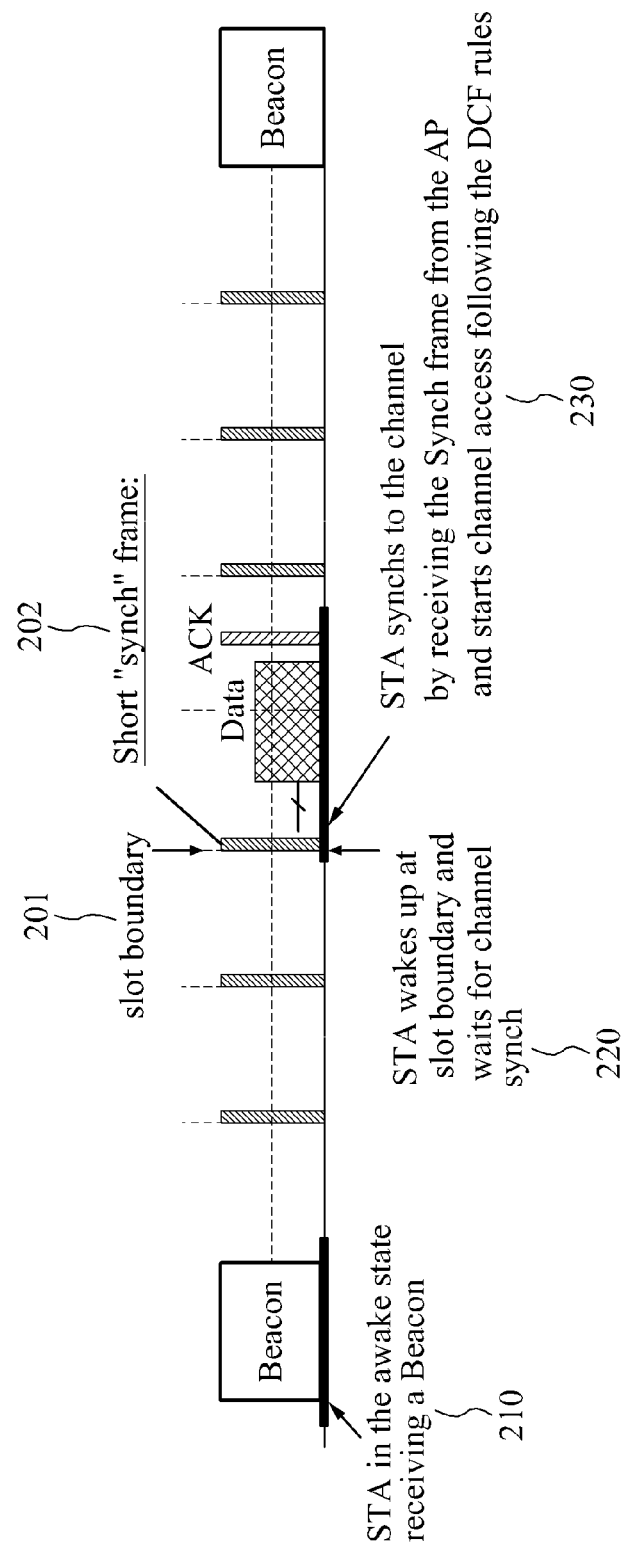
FIGS. 2 and 3 are diagrams illustrating an example of using a synchronization (synch) frame for avoiding an occurrence of a collision and saving power when two STAs waking up from a sleeping state in a conventional slotted channel access scheme are a hidden node to each other.
Figure 3:
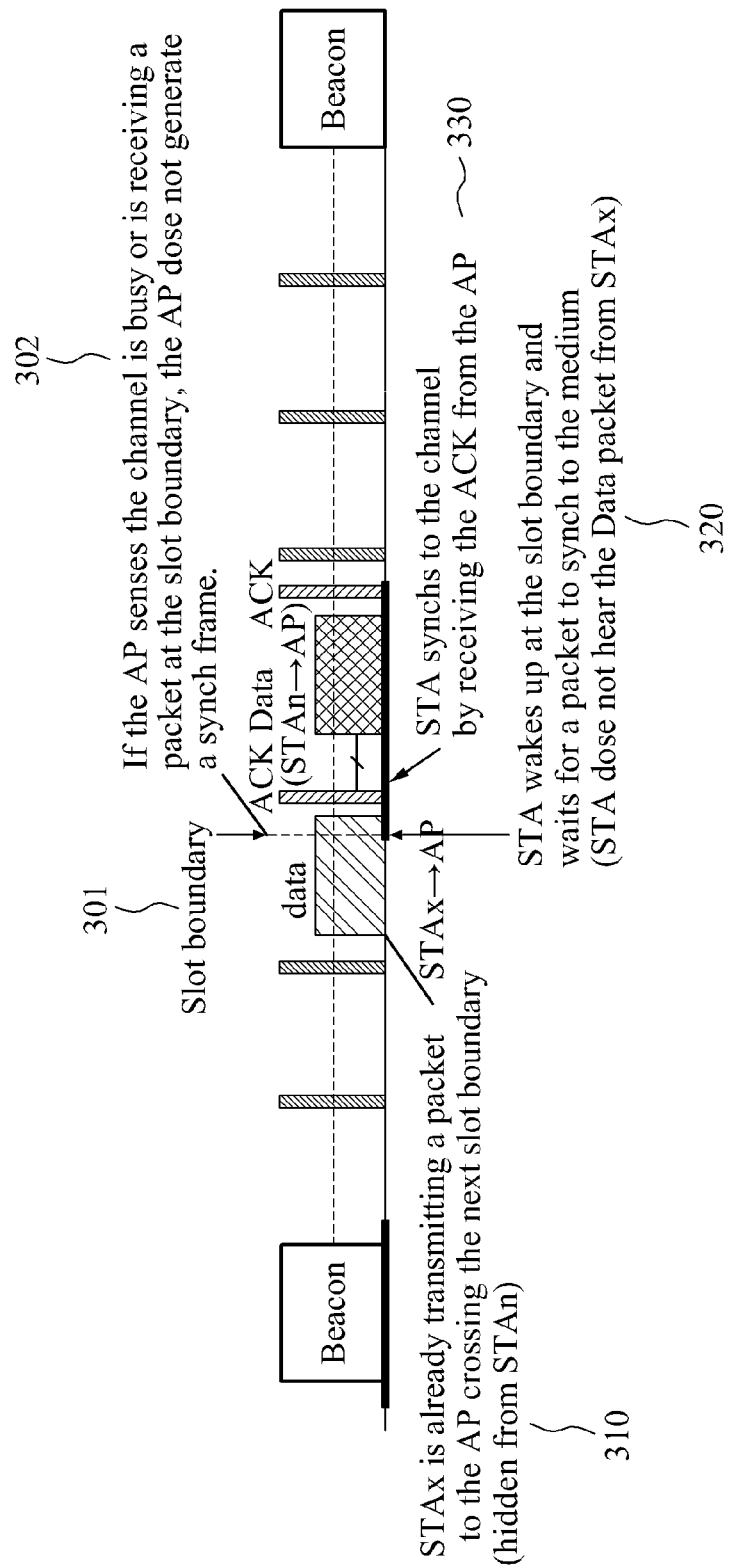

FIGS. 2 and 3 are diagrams illustrating an example of using a synchronization (synch) frame for avoiding an occurrence of a collision and saving power when two STAs waking up from a sleeping state in a conventional slotted channel access scheme are a hidden node to each other.

An STA that wakes up at a slot start by receiving an allocated slot from an AP may be unaware of the existence of the hidden node. To assist with this, the AP may transmit the synch frame when a channel is in an idle state at the slot start.

Referring to FIG. 1, in the conventional slotted channel access scheme, the STA may receive a synch frame 202 from the AP at a slot boundary 201 and access a channel using a DCF. For example, in 210, the STA in an awake state may receive a beacon message from the AP. In 220, the STA may wake up at the slot boundary 201 and wait for a channel synch. In this instance, the AP may transmit the synch frame 202 from the slot boundary 201 to the STA. In 230, the STA may synch to the channel using the synch frame 202 received from the AP, and start a channel access according to DCF rules.

As another conventional operation example, referring to FIG. 3, when an AP senses the channel is busy or is in a process of receiving data from the STA at a slot boundary 301, the AP may not transmit the synch frame in 302. Since the STA does not receive the synch frame, the STA may wait without accessing the channel. According to a waiting rule of an STA, the waiting may be continued until one of (i) receiving the synch, (ii) receiving another frame from the access point, and (iii) ending of Probe delay interval is satisfied.

Accordingly, the STA, which wakes up at the allocated slot boundary 301 and tries to access the channel, may be unaware whether the corresponding channel is occupied. Thus, the STA may determine whether the corresponding channel is occupied using the synch frame transmitted from the AP, and synch to a medium by receiving the synch frame to access the channel.

For example, in 310, when an STA-x is a hidden node with respect to an STA-n, the STA-x may be in a process of transmitting a packet to the AP crossing the slot boundary 301. In 320, the STA may wake up at the slot boundary 301 and wait for the packet to synch to the medium. Here, the STA may not listen to a data packet from the STA-x. In 330, the STA may synch to the channel by receiving an ACK frame from the AP.

Figure 5:
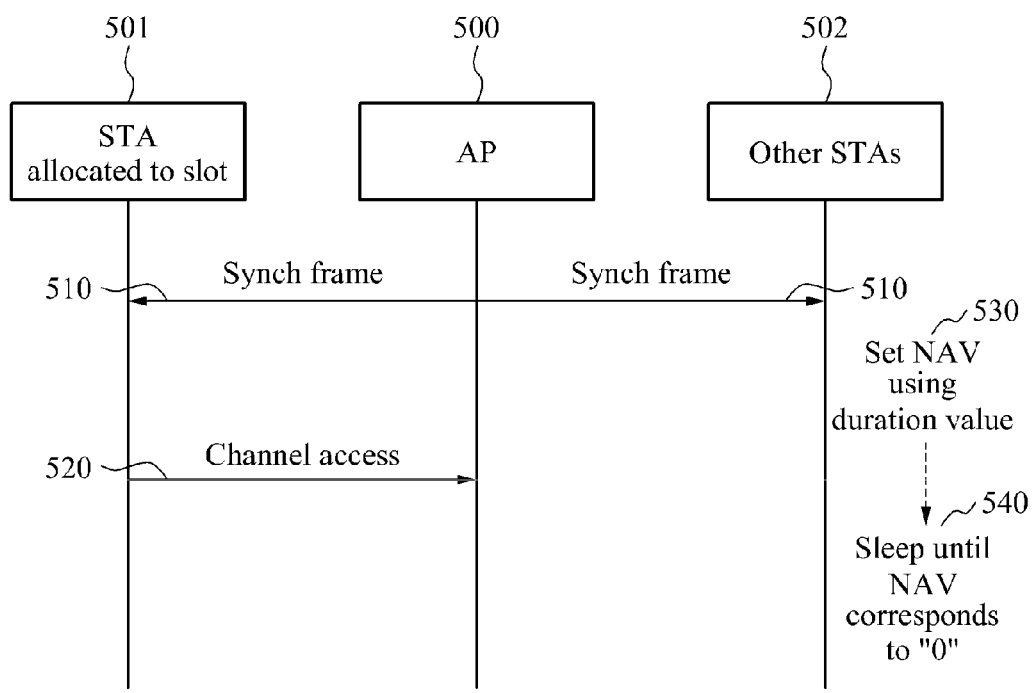
FIG. 5 is a diagram illustrating an example of using a duration value in the slot use control method according to an embodiment of the present invention.
Figure 6:
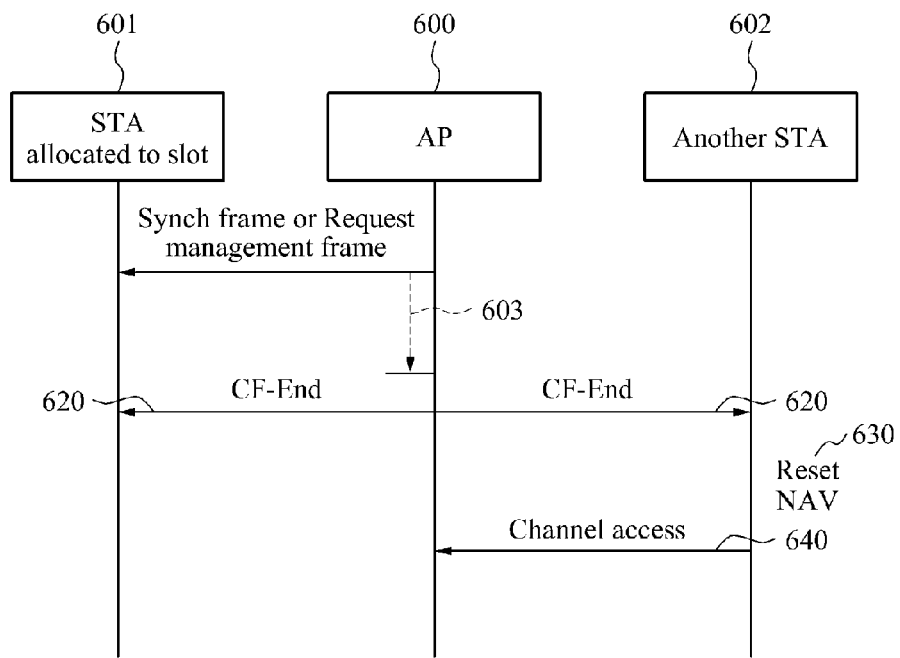
FIGS. 6 and 7 are diagrams illustrating an operation of releasing a slot in the slot use control method according to an embodiment of the present invention.

In a conventional method of FIGS. 5 and 6, an operation of an allocated STA is explained without describing operations of another STA in a network. The other STA, aside from the allocated STA, may also wake up and initiate a channel access by receiving a synch frame. In this instance, an operation of an STA may vary depending on whether an access of the STA allocated to a slot is to be allowed or an access of all STAs receiving the synch frame is to be allowed. Thus, predeterminations with respect to the operation of the allocated STA and the operation of the other STA in a network are equally required.

Figure 4:
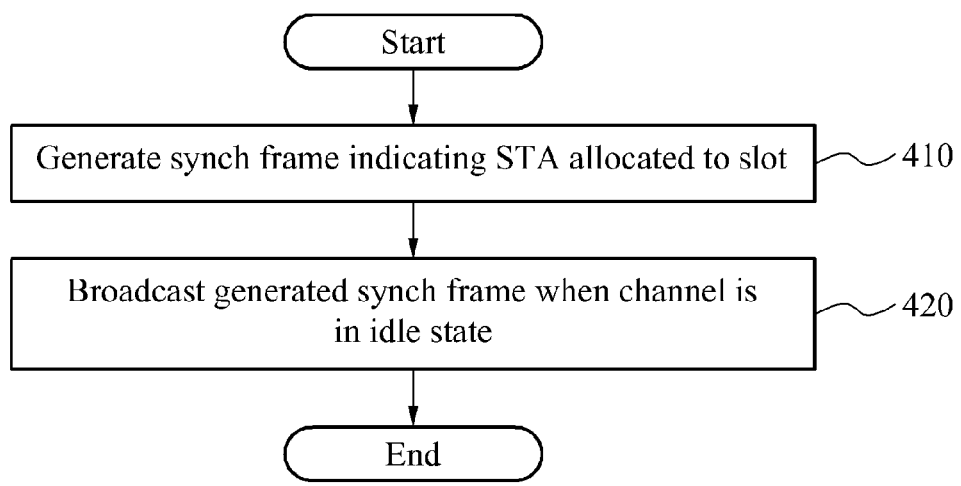
FIG. 4 is a flowchart illustrating the slot use control method according to an embodiment of the present invention.

FIG. 4 is a flowchart illustrating the slot use control method according to an embodiment of the present invention.

Referring to FIG. 4, an AP may control a slotted channel access of an STA in a WLAN. Hereinafter, a method of controlling the slotted channel access of an STA by the AP is referred to as the slot use control method.

In operation 410, a synch frame indicating an STA allocated to a slot may be generated using the slot use control method. The STA allocated to a slot may be a single STA or a station group including a plurality of STAs.

Depending on a case, the synch frame may be generated by setting a receiver address (RA) value in a media access control (MAC) header.

In the slot use control method, when a short MAC (SM) header is used to reduce a scale of the MAC header, a receiver association identification (AID) value and a basic service set identification (BSSID) value may be used in lieu of the RA value. For example, the synch frame may be generated by setting the receiver AID value and the BSSID value to the SM header. In this instance, since an AID is unique to a basic service set (BSS), an STA may be uniquely identified through concurrent use of a BSSID.

When the station group is hierarchically divided using the AID value, the station group may be identified based on most significant bits (MSBs) of the AID used to identify a group. For example, when the STA allocated to a slot corresponds to the station group including a plurality of STAs and the station group is hierarchically divided using the AID value, the synch frame may be generated using a value of MSBs of the AID value as an identification value in the slot use control method.

Depending on an example, least significant bits (LSBs) may be allowed to use one pattern. In the slot use control method, a value of LSBs of the AID value may have identical patterns. For example, all the LSBs may be set to "0".

However, since the station group may include an STA having a combination of MSBs and LSBs, a separate bit field may be prepared to identify a group station and a unique station. In the slot use control method, when the STA allocated to a slot corresponds to the group station including a plurality of STAs, the synch frame may be generated by setting an identification bit field to identify the group station and the unique station included in the station group.

Since the synch frame is transmitted to each frame, having a shorter length of the synch frame may be advantageous. Thus, the synch frame may be provided in a format of a null data packet (NDP). The NDP may be a frame including a preamble. The preamble may include a long training field (LTF), a short training field (STF), and a signal (SIG) field for synchronization and channel estimation. Thus, the receiver AID and the BSSID may be applied to the SIG field. In the slot use control method, the synch frame may be generated in a format including at least one of the LTF, the STF, and the SIG field. In the slot use control method, the receiver AID value and the BSSID value may be set in the SIG field for setting of the synch frame.

In this instance, a partial AID or a partial BSSID may be used due to a limitation on a number of bits in the SIG field. Also, a form of scrambling may be used because a unique determination may not be performed with the partial AID or the partial BSSID. Thus, the partial AID value or the partial BSSID value may be set in the SIG field in the slot use control method.

As described above, when the synch frame including the identification value is generated and when the channel is in an idle state at a start point of the slot, the generated synch frame may be broadcast in operation 420. Thus, when the synch frame is received, the STA indicated in the synch frame may be allowed a channel access. Other STAs which are disallowed the channel access may wait.

Depending on an example, a duration value may be notified for saving power of other STAs aside from an indicated STA in the slot use control method. Hereinafter, an example of using the duration value will be described with reference to FIG. 5.

FIG. 5 is a diagram illustrating an example of using a duration value in the slot use control method according to an embodiment of the present invention.

Referring to FIG. 5, in operation 510, an AP 500 may generate a synch frame to further include the duration value. In the slot use control method, for example, the synch frame may be generated to include the duration value and an identification value indicating an STA 501 allocated to a slot. In operation 520, when the synch frame is received, the STA 501 indicated in the synch frame may be allowed a channel access.

In operation 530, other STAs 502, aside from the STA 501 indicated in the synch frame, may set a network allocation vector (NAV) using a received duration value. In operation 540, the other STAs 502 may not access a channel until the NAV corresponds to "0". For example, the other STAs 502 may be changed into a sleep status until the NAV corresponds to "0". Thus, the STA 501 allocated to the slot may be protected from an occurrence of collisions.

As an example, when an NDP is used, a duration field may not be added due to a limitation on a number of bits. In this example, a length of an interval may be indicated using a value determined implicitly. The synch frame may be transmitted in each of the intervals. In the slot use control method, a value indicating a length of an interval in which the synch frame is retransmitted may be set. Also, the synch frame may be retransmitted in each of the intervals having the predetermined value.

An interval value generally has the same meaning as a meaning of a slot duration. Since the interval value is used for an STA which does not listen to a beacon or an STA of an OBSS, the interval value may be a fixed value rather than a varying value, such as, the slot duration. For example, the value indicating a length of an interval in which the synch frame is retransmitted may be set to the fixed value. Transmitting the synch frame in each of fixed intervals is to protect a slot from being used by an STA entering a channel in an allocated slot interval.

According to an example embodiment of the present invention, a slot being protected may be released so that another STA may be allowed access. Hereinafter, an operation of releasing a slot will be described with reference to FIGS. 6 and 7.

Figure 7:
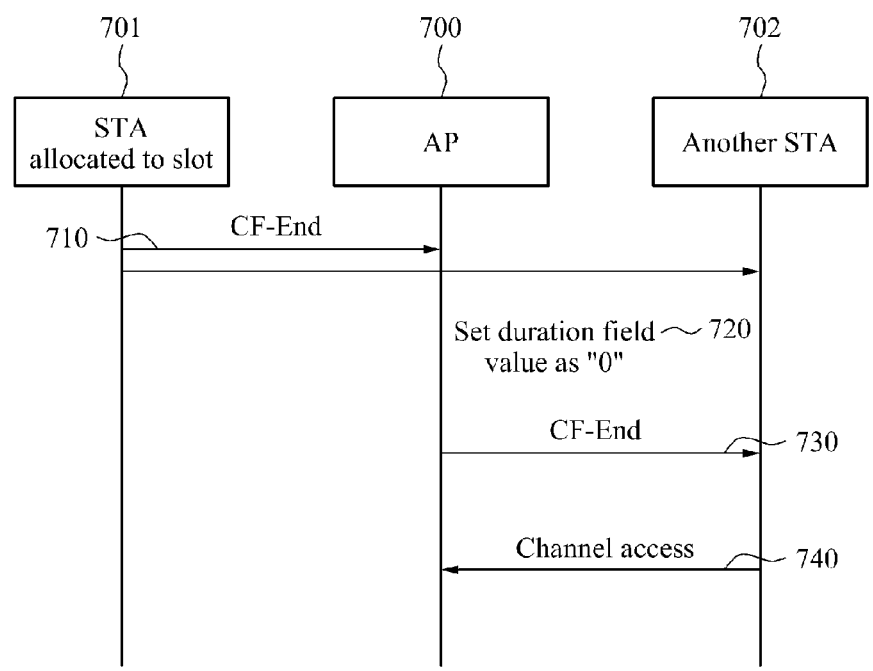

FIGS. 6 and 7 are diagrams illustrating an operation of releasing a slot in the slot use control method according to an embodiment of the present invention.

Protection of the allocated slot may be implemented using one of acquiring an NAV by an RTS/CTS exchange, restricting access using a beacon by an AP, setting the NAV using a synch frame including a duration field, and the like, or a combination thereof.

An STA allocated to the slot may not make a full use of a slot being protected. In this instance, a CF-end frame may be used to allow an access of another STA by releasing an NAV in the slot use control method according to an embodiment.

Referring to FIG. 6, when an STA 601 allocated to a slot being protected does not enter, the slot may be released in the slot use control method.

Referring to FIG. 6 again, in a case of a UL, an AP 600 may transmit a synch frame in operation 610. Also the AP 600 may wait for a frame from the STA 601 allocated to the slot to be received.

In operation 620, when the frame is not received from the STA 601 allocated to the slot during a period of data sensing time 603, the CF-end frame may be transmitted in the slot use control method. For example, the AP 600, by transmitting the CF-frame, may notify another STA 602 aside from the STA 601 allocated to the slot, of release of the allocated slot In operation 630, the other STA 602 received the CF-end frame may reset a predetermined NAV. In operation 640, the other STA 602 may access a channel. In this instance, the other STA 602 may start the channel access after recognizing a duration field value included in the CF-end frame.

In a case of a downlink (DL), the AP 600 may transmit a request management frame to the STA 601 allocated to the slot in operation 610. In operation 620, when a response management frame in response to the request management frame is not received from the STA 601 allocated to the slot during a predetermined period of the data sensing time 603, the AP 600 may be aware that an STA is absent and transmit the CF-end frame. Here, the response management frame may be, for example, an ACK frame with respect to data transmitted to the STA 601 allocated to the slot, a CTS frame pertaining to an RTA, a response management frame pertaining to a management frame having a format of a request, and the like. An operation of the other STA 602 received the CF-frame may be identically performed to the case of the UL.

Referring to FIG. 7, when data to be subsequently used is absent during use of a channel, an STA 701 allocated to a slot may release the channel.

In operation 710, when a frame to be subsequently transmitted is absent, the STA 701 allocated to a slot may transmit a CF-end frame to an AP 700. Depending on a case, the STA 701 may set a value including a sum of a time for transmitting a CF-end frame, a short interframe space (SIFS), and a time for transmitting a response CF-end frame as a duration field value.

In operation 720, the AP 700 may receive the CF-end frame from the STA 701 allocated to the slot and set the duration field value as "0".

In operation 730, the AP 700 may transmit the CF-end frame to which the duration field value is set to "0", to the other STA 702 aside from the STA 701 allocated to the slot.

In operation 740, when the other STA 702 receives at least one of the CF-frame transmitted from the STA 701 allocated to the slot and the CF-end frame transmitted from the AP 700, the other STA 702 may access the channel after a channel duration time ends.

According to an embodiment of the present invention, a method of NAV setting by using the duration field and a method of transmitting the synch frame for each predetermined interval during a data exchange may be applied to a resource allocated by being scheduled without using a slotted channel access. Hereinafter, a further description will be provided with respect to FIG. 8.

Figure 8:
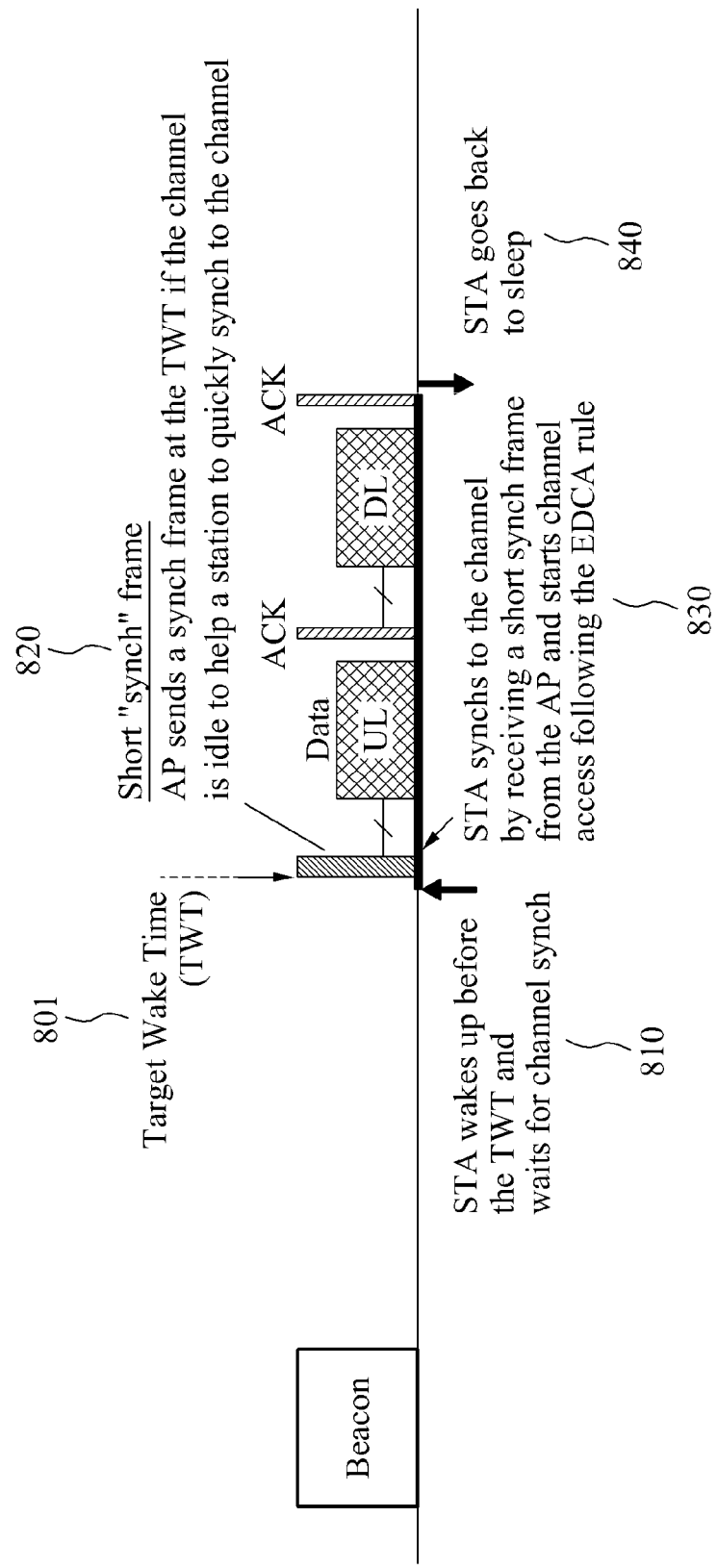
FIG. 8 is a diagram illustrating an operation of supporting a schedule-negotiated station in the slot use control method according to an embodiment of the present invention.

FIG. 8 is a diagram illustrating an operation of supporting a schedule-negotiated station in the slot use control method according to an embodiment of the present invention.

An AP may support an STA that wakes up based on a negotiated schedule and tries to perform a data exchange. The STA may have a low-duty cycle, for example, a sensor, and be sensitive to power consumption. Thus, the STA may perform the data exchange by waking up at a scheduled time. The AP may notify a predetermined STA of time information after an allocation is performed. Here, the time information may include a target wake time (TWT) indicating a time to wake up, and an interval indicating an allocated time interval after waking up. Similar to the aforementioned case of the slotted channel access, when the STA wakes up at the TWT, a collision may occur due to a hidden node. For example, the collision may occur when the other STA wakes up while the STA is in a process of transmitting data, or when an OBSS STA, which is a hidden node with respect to the STA transmitting data, is present. Since a significant reduction in power consumption of the STA is required to avoid an occurrence of the collision, the AP may transmit the synch frame in a middle of data, and transmit a duration field including a remaining time for an allocated time interval.

In operation 810, an STA may wake up at a TWT 801 and wait for a channel synch. In operation 820, to assist the STA to rapidly synch to a channel, the AP may transmit the synch frame at the TWT 801 when the channel is in an idle state. In operation 830, the STA may synch to the channel by receiving the synch frame, and start a channel access according to enhanced distributed channel access (EDCA) rules. In operation 840, when data transmission ends, the STA may revert to a sleep mode.

Figure 9:
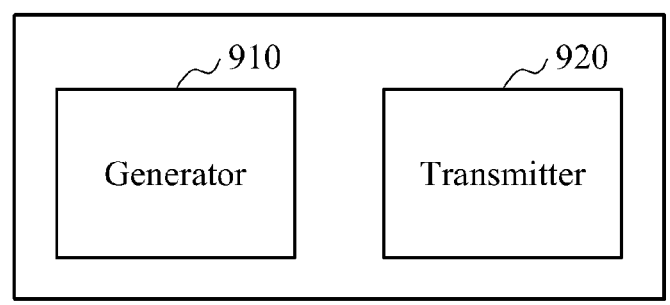
FIG. 9 is a diagram illustrating a configuration of the slot use control apparatus according to an embodiment of the present invention.

FIG. 9 is a diagram illustrating a configuration of a slot use control apparatus according to an example embodiment.

Referring to FIG. 9, a slot use control apparatus 900 may control a slotted channel access of an STA in a WLAN. The slot use control apparatus 900 may be disposed in an AP to be operated.

The slot use control apparatus 900 includes a generator 910 and a transmitter 920.

The generator 910 may generate a synch frame including a value indicating an STA allocated to a slot. The STA allocated to a slot may be a single STA and a station group including a plurality of STAs.

Depending on a case, the synch frame may be generated by setting an RA value in an MAC header.

When an SM header is used to reduce a scale of the MAC header, a receiver AID value and a BSSID value may be used in lieu of an RA value. For example, the synch frame may be generated by setting the receiver AID value and the BSSID value to the SM header in the slot use control method. In this instance, since an AID is unique to a BSS, an STA may be uniquely identified through concurrent use of a BSSID.

When the station group is hierarchically divided using the AID value, the station group may be identified based on MSBs of the AID used to identify a group. For example, when the STA allocated to a slot corresponds to the station group including a plurality of STAs and the station group is hierarchically divided using the AID value, the generator 910 may generate the synch frame using a value of MSBs of the AID value as an identification value.

Depending on an example, LSBs may be allowed to use one pattern. In terms of the generator 910, a value of LSBs of the AID value may have identical patterns. For example, the value of LSBs may be set to "0".

However, since the station group may include an STA having a combination of MSBs and LSBs, a separate bit field may be prepared to distinguish a group station and a unique station. When the STA allocated to a slot corresponds to the group station including a plurality of STAs, the generator 910 may generate the synch frame by setting an identification bit field to identify the group station and the unique STA included in the station group.

Since the synch frame is transmitted to each frame, having a shorter length of the synch frame may be advantageous. Thus, the synch frame may be provided in a form of an NDP. Here, the NDP may be a frame including a preamble. The preamble may include an LTF, an STF, and an SIG field for synchronization and channel estimation. Thus, the receiver AID and the BSSID may be applied to the SIG field. For example, the generator 910 may generate the synch frame to have a format including at least one of the LTF, the STF, and the SIG field. The generator 910 may also set the synch frame by setting the receiver AID value and the BSSID value to the SIG field.

In this instance, a partial AID or a partial BSSID may be used due to a limitation on a number of bits in the SIG field. Also, a form of scrambling may be used because a unique determination may not be performed with the partial AID or the partial BSSID. Thus, the generator may set the partial AID value or the partial BSSID value to the SIG field.

As described above, when the synch frame including the identification value is generated and the channel is in an idle state at a start point of the slot, the transmitter 920 may broadcast the generated synch frame. Thus, when the synch frame is received, the STA indicated in the synch frame may be allowed a channel access. Other STAs which are disallowed the channel access may wait.

Depending on an example, the generator 910 may add a duration value for saving power of STAs, aside from an indicated STA.

For example, the generator 910 may generate a synch frame to include the duration value and an identification value indicating an STA allocated to a slot. When the synch frame is received, the STA indicated in the synch frame may be allowed a channel access.

The other STAs, aside from the STA indicated in the synch frame, may set an NAV using a received duration value. Also, the other STAs may not access a channel until the NAV corresponds to "0". For example, the other STAs may be changed into a sleep status until the NAV corresponds to "0". Thus, the STA allocated to the slot may be protected from an occurrence of collisions.

As an example, when an NDP is used, a duration field may not be added due to a limitation on a number of bits. In this example, a length of an interval may be indicated using a value determined implicitly. The synch frame may be transmitted in each of the intervals. The generator 910 may set a value indicating a length of an interval in which the synch frame is retransmitted. Also, the generator 910 may retransmit the synch frame for each of the intervals having the predetermined value.

An interval value generally has the same meaning as a meaning of a slot duration. Since the interval value is used for an STA which does not listen to a beacon or an OBSS STA, the interval value may use a fixed value rather than a varying value, such as, the slot duration. For example, the generator 910 may set the value indicating a length of an interval in which the synch frame is retransmitted, as the fixed value. Transmitting the synch frame in each of fixed intervals is to protect a slot use from an STA entering a channel in an allocated slot interval.

According to an embodiment of the present invention, the slot use control apparatus may release a slot being protected from the protection so that another STA may be allowed access.

Protection of the allocated slot may be implemented using one of acquiring an NAV by an RTS/CTS exchange, restricting an access using a beacon by an AP, setting the NAV using a synch frame including a duration field, and the like, or a combination thereof.

An STA allocated to the slot may not make a full use of a slot being protected. In this instance, the slot use control apparatus 900 according to an example embodiment may use a CF-end frame to allow an access of the other STAs by releasing the NAV.

In a case of an UL, the transmitter 902 included in the slot use control apparatus 900 may transmit the synch frame. Also the slot use control apparatus 900 may wait for receiving a frame from the STA allocated to the slot.

When the frame is not received from the STA allocated to the slot during a period of data sensing time, the generator 910 may be transmit the CF-end. For example, the slot use control apparatus 900, by transmitting the CF-frame, may notify the other STA aside from the STA allocated to the slot, of release of the allocated slot The other STA received the CF-end frame may reset a predetermined NAV. Also, the other STA may access a channel. In this instance, the other STA may start the channel access after recognizing a duration field value included in the CF-end frame.

In a case of a DL, the transmitter 920 may transmit a request management frame to the STA allocated to the slot. When a response management frame responding to the request management frame is not received from the STA allocated to the slot during a predetermined period of the data sensing time, the slot use control apparatus 900 may be aware that an STA is absent, and transmit the CF-end frame. Here, the response management frame may be, for example, an ACK frame with respect data transmitted to the STA allocated to the slot, a CTS frame with respect to an RTA, a response management frame with respect to a management frame in a form of request, and the like. An operation of the other STA received the CF-frame may be performed identically to the case of the UL.

Depending on an example, when data to be subsequently used is absent during use of the channel, the STA allocated to a slot may release the channel.

When a frame to be subsequently transmitted is absent, the STA allocated to a slot may transmit the CF-end frame to the slot use control apparatus 900. As an example, the STA may set a value including a sum of a time for transmitting the CF-end frame, an SIFS, and a time for transmitting a response CF-end frame as a duration field value.

The slot use control apparatus 900 may receive the CF-end frame from the STA allocated to the slot and set the duration field value as "0".

Also, the transmitter 920 may transmit the CF-end frame to which the duration field value is set as "0" to the other STA aside from the STA allocated to the slot.

When the other STA receives at least one of the CF-frame transmitted from the STA allocated to the slot and the CF-end frame transmitted from the AP, may access the channel after a channel duration time ends.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for an access point (AP) to provide synchronization to a station (STA) in a wireless local area network (WLAN), the method comprising:
    transmitting a synchronization frame including a receiver address (RA) field including an identification value indicating a STA;
    after transmitting the synchronization frame, waiting for a response waiting time; and when a response frame in response to the synchronization frame is not received during the response waiting time, transmitting a contention free-end (CF-End) frame, wherein the CF-End frame is transmitted by the AP to reset a network allocation vector (NAV), and wherein the synchronization frame is distinguished from a beacon frame, and is transmitted between beacon frames.

2. The method of claim 1, wherein the synchronization frame is transmitted at a time point when the STA wakes up.

3. The method of claim 2, wherein the synchronization frame is transmitted when a channel is in an idle state at the time point when the STA wakes up.

4. The method of claim 3, wherein the time point when the STA wakes up corresponds to at least one of a slot boundary of time slots allocated to the STA or a target wake time (TWT) for the STA.

5. The method of claim 4, wherein the synchronization frame is used for protecting at least one of the time slot allocated to the STA or the TWT for the STA.

6. The method of claim 1, wherein the synchronization frame is transmitted in a form of a null data packet (NDP) which includes a Short Training Field (STF) field, a Long Training Field (LTF) field, a Signal (SIG) field without a Data field.

7. The method of claim 1, wherein the RA field of the synchronization frame comprises information of at least one of a partial association identifier (AID) or a partial basic service set identifier (BSSID).

8. The method of claim 1, wherein the response frame is transmitted from the STA to the AP.

9. The method of claim 8, wherein the response frame is an uplink data frame.

10. The method of claim 1, wherein the synchronization frame further includes a Duration field.

11. The method of claim 10, wherein a value of the Duration field is used for transmitting the response frame by the STA.

12. The method of claim 10, wherein a value of the Duration field is used for setting a NAV by at least one station other than the STA.

13. An apparatus for an access point (AP) to provide synchronization to a station (STA) in a wireless local area network (WLAN), the apparatus comprising:

a generator configured to generate a synchronization frame including a receiver address (RA) field including an identification value indicating a STA; and a transmitter configured to transmit the synchronization frame, wherein, after transmitting the synchronization frame, the apparatus waits for a response waiting time, wherein the transmitter is configured to further transmit a contention free-end (CF-End) frame when a response frame in response to the synchronization frame is not received during the response waiting time, wherein the CF-End frame is transmitted by the AP to reset a network allocation vector (NAV), and wherein the synchronization frame is distinguished from a beacon frame, and is transmitted between beacon frames.

* * * * *